United States Patent
Whittle

[11] Patent Number: 6,030,087
[45] Date of Patent: Feb. 29, 2000

[54] LIGHT REFLECTOR

[75] Inventor: Malcolm David Whittle, Le Mont-sur-Lausanne, Switzerland

[73] Assignee: Elinca S.A., Switzerland

[21] Appl. No.: 09/123,243

[22] Filed: Jul. 27, 1998

[30] Foreign Application Priority Data

May 14, 1998 [EP] European Pat. Off. .............. 98108797

[51] Int. Cl.[7] .................................................. G03B 15/02
[52] U.S. Cl. ........................... 362/18; 362/278; 362/320; 362/352
[58] Field of Search ................................ 362/16, 18, 278, 362/296, 306, 320, 341, 343, 351, 352, 353, 358; 359/838, 847

[56] References Cited

U.S. PATENT DOCUMENTS

| | | | |
|---|---|---|---|
| 923,542 | 6/1909 | Losey | 431/364 |
| 4,210,952 | 7/1980 | Ressmeyer | 362/17 |
| 4,807,089 | 2/1989 | Nussli | 362/17 |
| 5,023,757 | 6/1991 | Shirilla | 362/16 |
| 5,373,422 | 12/1994 | Hodkinson | 362/18 |
| 5,579,180 | 11/1996 | Geller | 359/847 |

FOREIGN PATENT DOCUMENTS

| | | |
|---|---|---|
| 2 489 672 | of 1982 | France . |
| 31 24 757 | of 1983 | Germany . |
| 645 735 | of 1984 | Switzerland . |

Primary Examiner—Cassandra Spyrou
Assistant Examiner—Mark A. Robinson
Attorney, Agent, or Firm—Anthony J. Casella; Gerald E. Hespos

[57] ABSTRACT

The light reflector is for use in photography and comprises a cloth 1 raised on radial ribs 2 each of which has a proximal end 3 and a distal end 4. The distal ends 4 of ribs 2 are removably engaged in pockets 5 formed at the angle edges 6 of the cloth 1. Each of the proximal ends of the ribs is removably engaged into a socket 29 pivotally mounted on an armature 10 adapted to be fastened on a lamphead 17. The central portion of cloth 1 is engaged on a sleeve which is part of the armature 10. A locking assembly 36 is mounted on each socket 29 to allow locking thereof in a position where it extends peripherally of the armature 10.

14 Claims, 4 Drawing Sheets

LIGHT REFLECTOR

BACKGROUND OF THE INVENTION

This invention relates to a light reflector for use in photography, comprising a metallized cloth raised on radial ribs, each of said ribs having a proximal end mounted on an armature adapted to be fastened to a light source and a distal end holding an edge portion of the cloth a substantially central portion of which engages said armature.

Light reflectors as described hereinbefore, and more particularly those named soft box light shapers, are universally used in photography for their extremely even light diffusion.

In the soft box light shapers, the armature, which is usually ring shaped, is adapted to surround the light source to which it is fastened and the proximal ends of the ribs are each mounted on a transverse axis which is pivotally affixed to the armature. Therefore, the ribs can be pivoted to extend radially of the armature or to be substantially parallel to the axis of the armature. Removable plates may be affixed to the armature in order to maintain the ribs in the radial position. The cloth is centrally affixed on the armature and the distal ends of the ribs are each affixed to an edge portion of the cloth.

Accordingly, the cloth may be spread like sort of an umbrella and maintained in that position via the removable plates holding the ribs in the radial position. The armature may then be affixed to the light source. To fold the reflector after removal thereof from the light source, it suffices to remove the plates to allow the ribs to pivot from their radial position towards the position in which they are substantially parallel to the axis of the armature whereby the cloth folds like an umbrella, The reflector may then be stowed away in a carrying bag.

Spreading and folding of the light reflector are relatively easy and rapid, although fixing and removal of the plates may prove difficult if they have been deformed or otherwise damaged. Furthermore, the system is place consuming and it cannot have a reduced floor-space, either for packaging and shipping purposes or for the normal coming and going of the photographer.

It is an object of this invention to propose a light reflector avoiding the aforesaid drawbacks. A further object of the invention is a light reflector which is versatile and easy to manufacture.

To this effect, the light reflector according to the invention complies with the definitions given in the claims.

Accordingly, when the proximal end of each of the ribs is removably mounted in the armature, the light reflector may be packaged for shipping or otherwise transported in a flat condition as the ribs removed from the armature may be simply collected as a bundle laid along the armature and the cloth. Manufacture of the ribs is simplified.

In one simple embodiment, the proximal end of each of the ribs is movably inserted into a socket of the armature. In a preferred embodiment aimed at ease of operation, the socket is pivoted on the armature between a first position where it extends substantially peripherally of the armature and a second position where it extends at substantially 90 degrees from the first position.

Preferably the armature is ring shaped with said first position of the socket being radial to the ring shaped armature and said second position of the socket being substantially parallel to an axis of the ring shaped armature. There may be means for locking the socket in said first position. In a still preferred embodiment, said means for locking the socket in said first position comprise a sleeve mounted on the socket for reciprocal motion thereon, and a peripheral radial aperture in said ring shaped armature for housing a portion of said sleeve. Spring means may be arranged between said socket and said sleeve for urging said portion of the sleeve into said radial aperture.

The ring shaped armature may be formed of two rings assembled to one another in facing condition, said facing rings comprising a plurality of radial transverse slots, and each of said sockets being mounted on an arm pivoted between said rings and extending through one of said slots.

In a further embodiment, a disk is mounted between said facing rings and sleeve means on said disk extend at least partly through said rings for housing the light source. Bayonet slots on said sleeve means provide for push-and-twist engagement of the light source. The disk may be rotatively mounted between said facing rings. In a still further embodiment, brake means may be provided for stopping rotation of the disk. In a preferred embodiment, said brake means comprise pad means mounted in one of said two rings for reciprocal motion towards and away from said disk, and pusher means on said ring for urging said pad means against said disk. Said pusher means may comprise bolt means meshing with a nut housed in said ring, said bolt means having one end facing said pad means and another ring projecting over said ring.

Preferably, the distal end of each of said ribs is removably housed in a pocket formed at said edge portion of the cloth.

Advantageously, the sleeve means project beyond one of said rings and said central portion of the cloth comprises an aperture engaged on said sleeve means projection.

These and other objects, features and advantages of the invention will become readily apparent from the following detailed description with reference to the accompanying drawings which show, diagrammatically and by way of example only, a preferred but still illustrative embodiment of the invention.

DETAILED DESCRIPTION OF THE INVENTION

Figure 1:
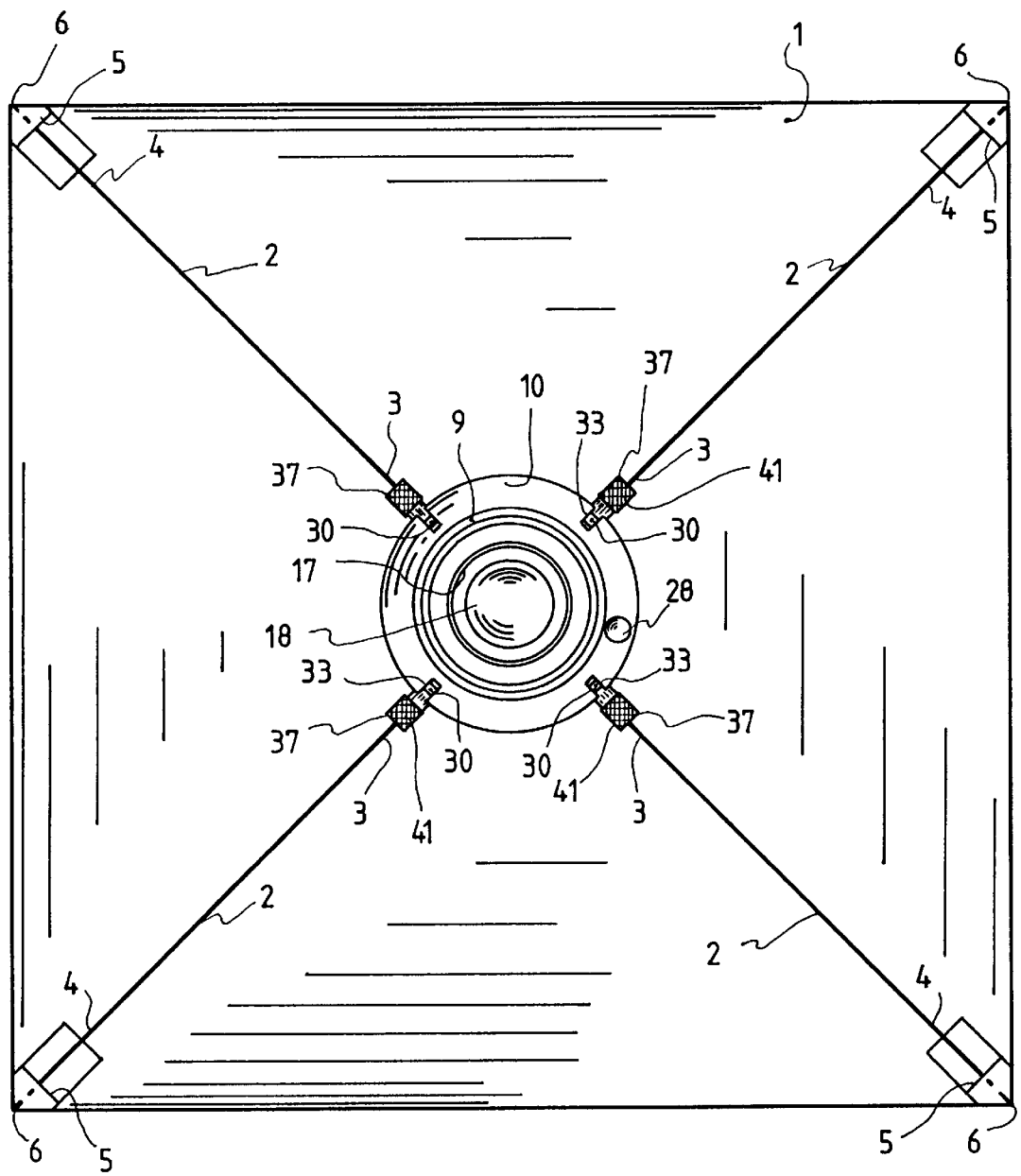
FIG. 1 is a front elevational view of the light reflector according to the invention.
Figure 2:
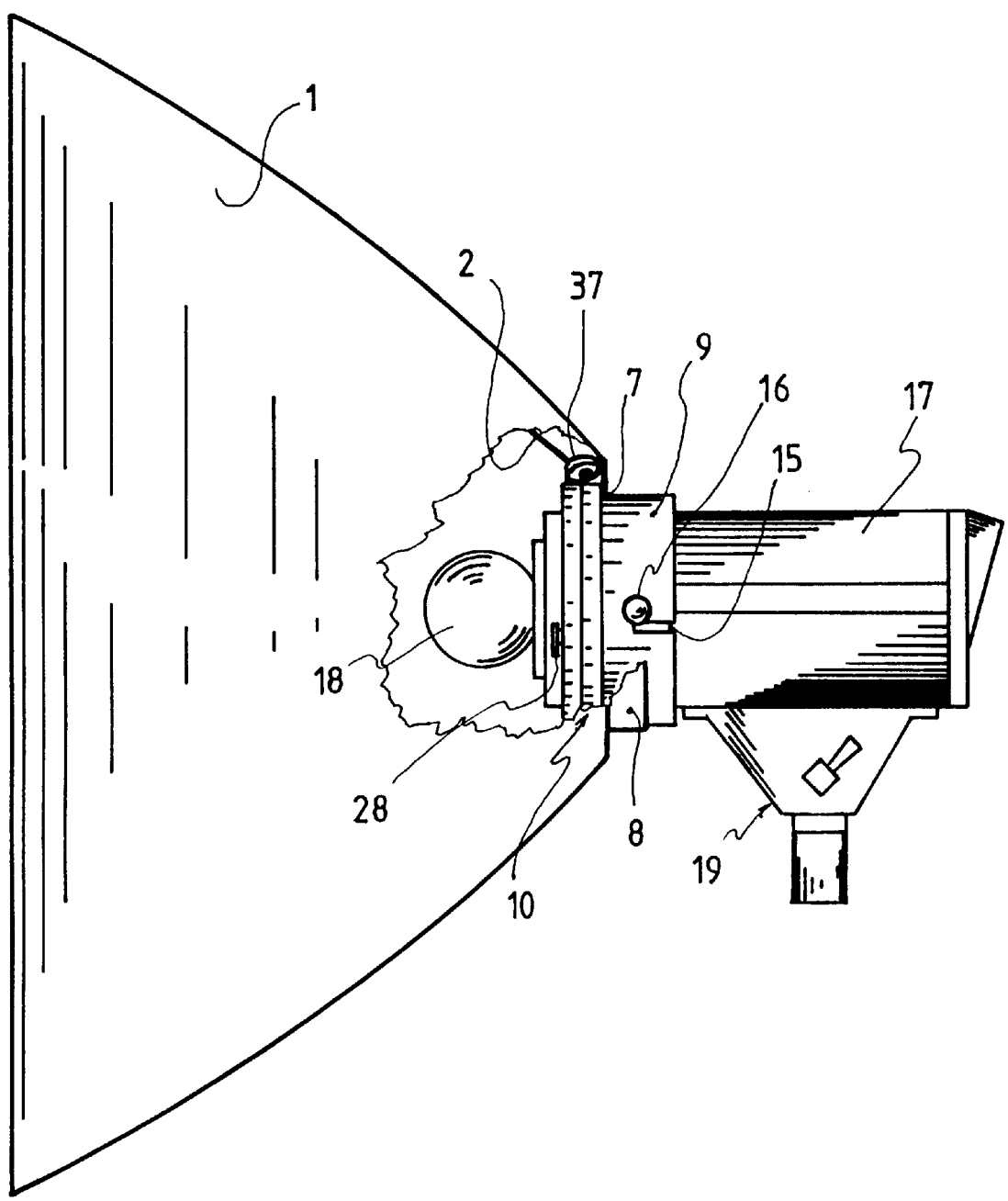
FIG. 2 is a side elevation of the light reflector of FIG. 1.
Figure 3:
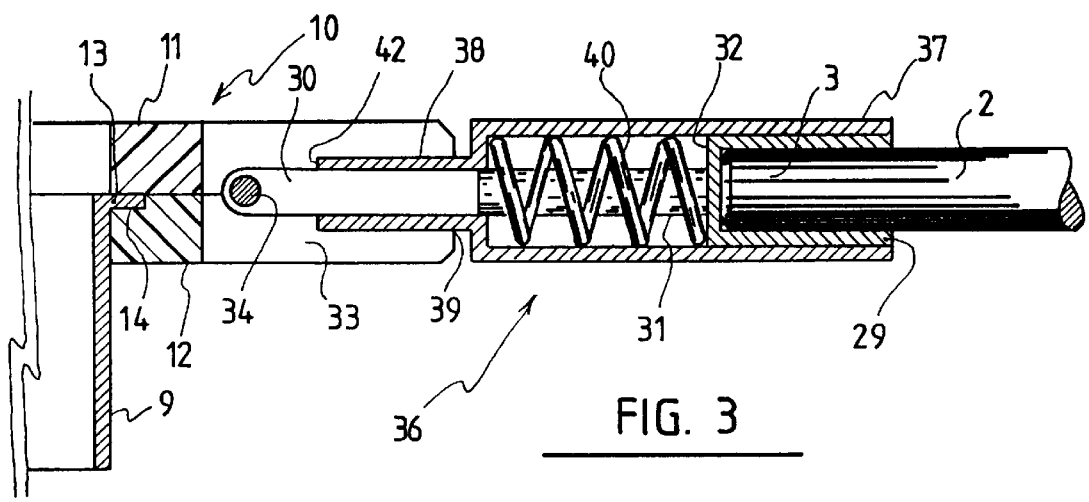
FIG. 3 is a longitudinal section of an enlarged detail of FIG. 1.
Figure 4:
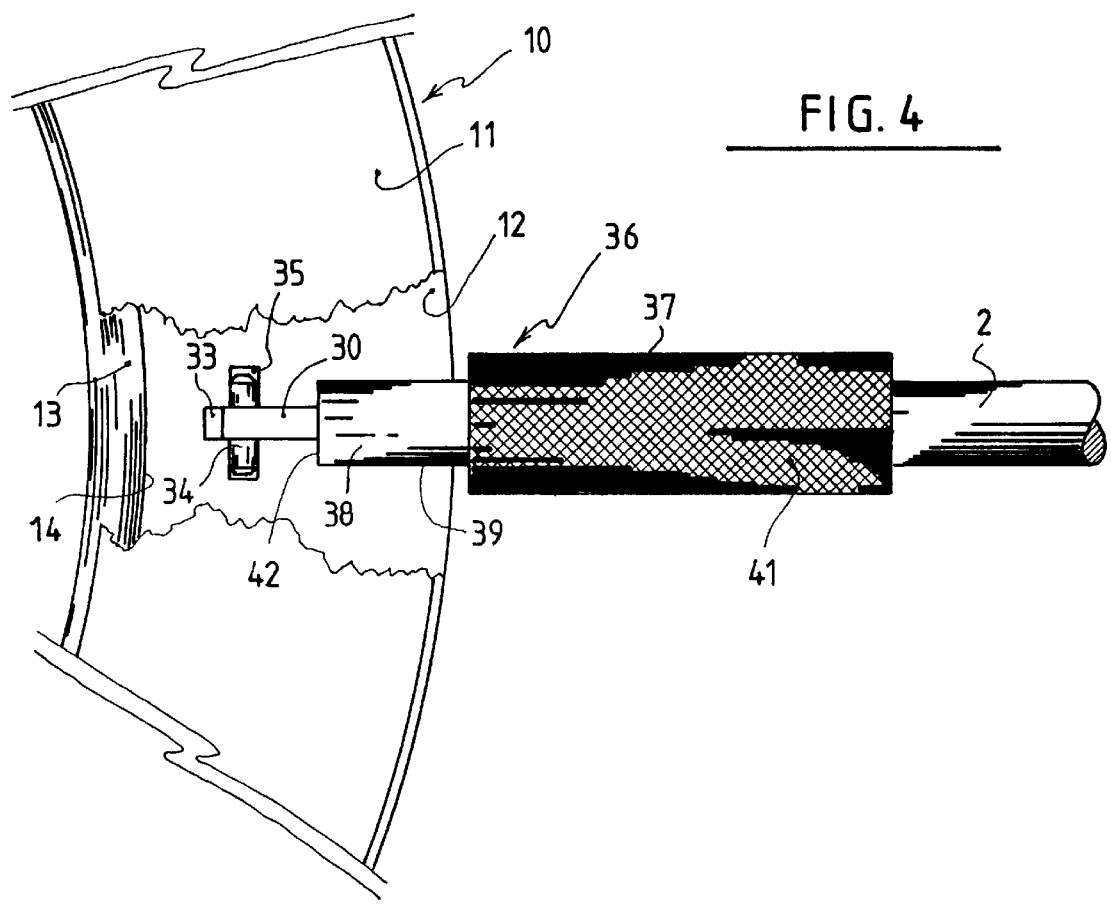
FIG. 4 is a top plan view of the detail of FIG. 3.

The light reflector shown in FIGS. 1 and 2 comprises a metallized cloth 1 raised on substantially resilient radial ribs 2 having each a proximal end 3 and a distal end 4.

The distal end 4 of each of ribs 2 is removably engaged in a pocket 5 formed, for example sewn, at one of the edge angles 6 of the cloth 1.

The central portion of cloth 1 comprises an aperture 7 reinforced by a muff 8 (FIG. 2) engaged on a sleeve 9 which is part of a ring shaped armature 10.

Ring shaped armature 10 is formed of two rings 11 and 12 assembled to one another in facing condition. Assembly of facing rings 11 and 12 may be made via glue, rivets or screws (not shown).

A disk 13 (FIGS. 3–6) is mounted rotatively in a groove 14 formed in ring 12 and is held in place by the assembly of rings 11 and 12. Disk 13 bears sleeve 9 which extends through rings 11 and 12 and projects beyond ring 12. On the portion of sleeve 9 which projects beyond ring 12, there are formed bayonet slots 15 for push-and-twist engagement of nuts 16 formed on a light source such as lamphead 17. Lamphead 17 projects through sleeve 9 of ring shaped armature 10 so that its bulb 18 is positioned within metallized cloth 1. Lamphead 17 is equipped with a swivel mount 19 for conventional fixing on a tripod (not shown).

A brake assembly 20 (FIG. 6) is mounted on ring 11 for stopping rotation of disk 13 within rings 11 and 12. Brake assembly 20 comprises a pad 21, for example of plastic material, slidably mounted in a housing 22 formed in ring 11 for reciprocal motion towards and away from disk 13, and a bolt 23 meshing in a hexagonal nut 24 located in a corresponding housing 25 of ring 11. Bolt 23 has one end 26 facing pad 21 and another end 27 projecting over ring 11. An operating knob 28 is affixed to end 27 of bolt 23 for control purposes. Hexagonal nut 24 may be affixed, for example by glue, in housing 25 of ring 11 but this is not compulsory. Accordingly, by screwing bolt 23 in nut 24 the end 26 of bolt 23 urges pad 21 against disk 13 which is pressed against groove 14 of ring 12. Disk 13 is thus braked or even blocked in its rotation with respect to rings 11 and 12. Unscrewing of bolt 23 frees pad 21 to allow rotation of disk 13 with respect to rings 11 and 12.

The proximal end 3 of each of ribs 2 is removably inserted into a socket 29 (FIGS. 3–6) mounted on a flat arm 30 formed at the end of a cylindrical portion 31 connected to the bottom 32 of socket 29. The arm 30 extends through a radial transverse slot 33 formed in rings 11 and 12. The free end of arm 30 bears a transverse axis 34 pivoted in a bearing 35 (FIG. 4) formed by hollow portions grooved in the facing surfaces of rings 11 and 12. Accordingly, each of the sockets 29 may pivot on the ring shaped armature formed by rings 11 and 12 between a first position where it extends substantially peripherally of the ring shaped armature 10 and a second position where it extends at substantially 90 degrees from the first position. In the example shown, the first position is radial to the ring shaped armature 10 and the second position is substantially parallel to the longitudinal axis of the ring shaped armature.

A locking assembly 36 is mounted on each socket 29 for locking it in the first position. Locking assembly 36 comprises a sleeve 37 mounted on the socket 29 and its cylindrical portion 31 for reciprocal motion thereon. The end of sleeve 37 which is opposed to socket 29 has a reduced diameter portion 38 which allows passage thereof along the arm 30 and cylindrical portion 31 of socket 29 and the free end of which is inserted into a peripheral radial aperture 39 (FIG. 5) formed in rings 11 and 12 along a portion of slots 33. A spring 40 is installed in the sleeve 37 between the bottom 32 of socket 29 and the reduced diameter portion 38. The outer surface of sleeve 37 is engine turned as at 42 to facilitate handling.

Figure 5:
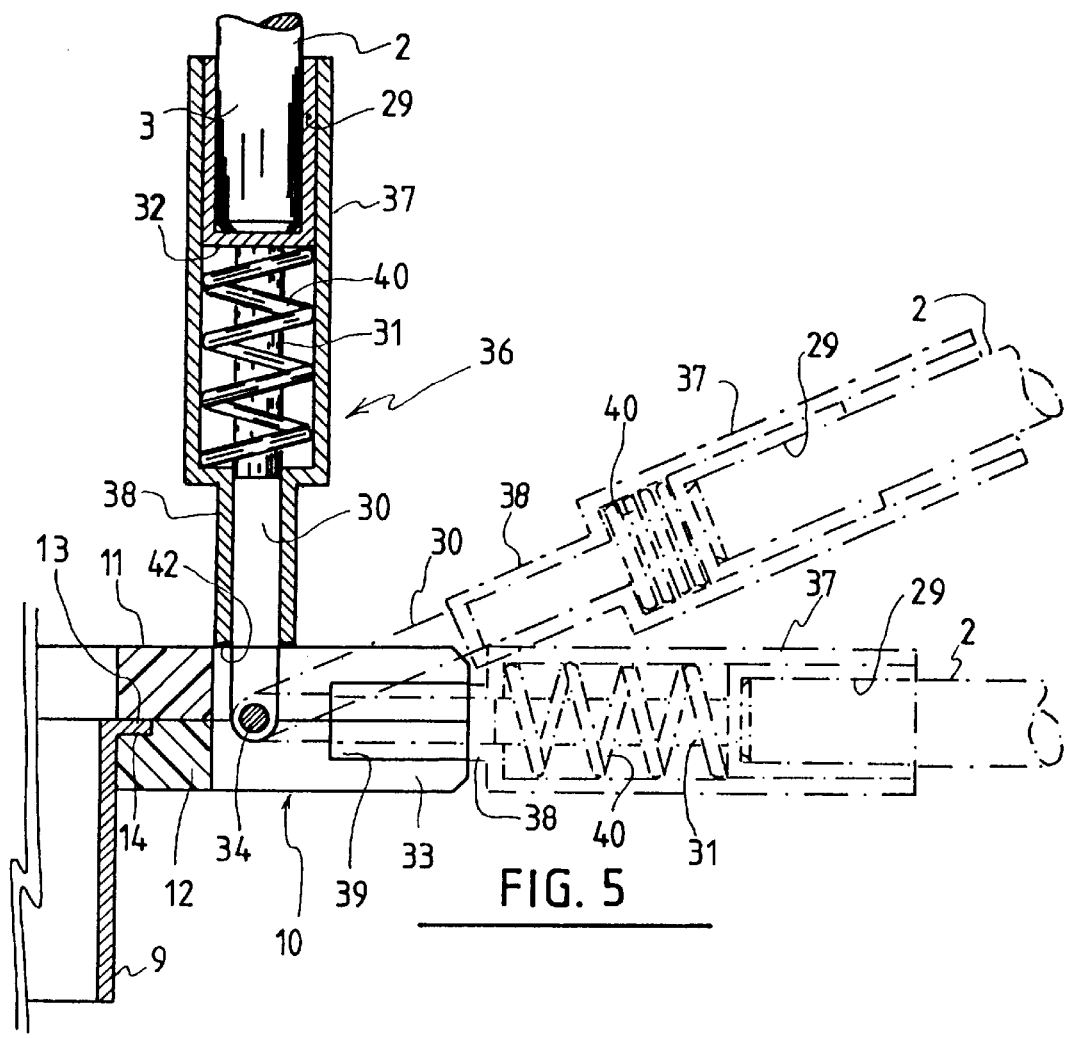
FIG. 5 is a longitudinal section showing the detail of FIG. 3 in another operative position.
Figure 6:
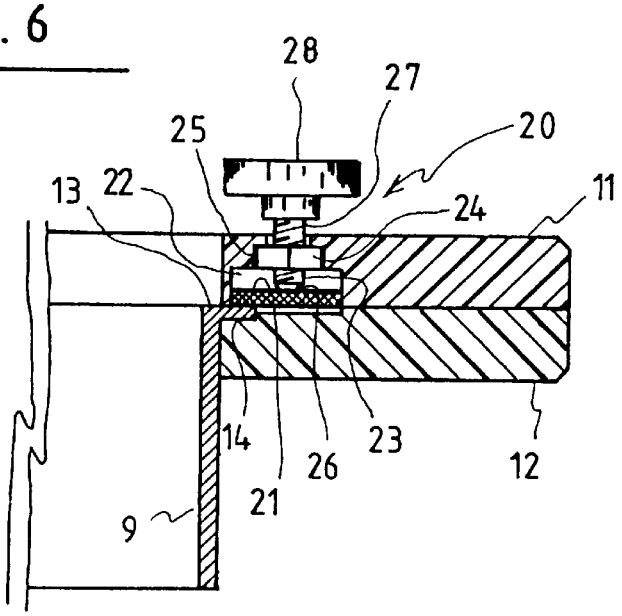
FIG. 6 is a longitudinal section of another enlarged detail of FIG. 1.

Accordingly, insertion of the reduced diameter portion 38 of sleeve 37 into the peripheral radial aperture 39 of armature 10 under the bias of spring 40 assures locking of socket 29 in its first position. Unlocking is simply obtained by pulling sleeve 37 to withdraw the reduced portion 38 out of the peripheral radial aperture 29 against the bias of spring 40 whereby the socket 29 and its locking assembly 36 may be pivoted in the second position where the free end 43 of reduced portion 38 bears against the outer surface of ring 11. FIG. 5 illustrates this function with the second position of the socket and locking assembly shown in full lines and the first and intermediate positions of the socket and locking assembly shown in dotted lines.

Raising of the reflector is simply obtained by placing the sockets 29 in their second position, inserting the proximal ends 3 of the ribs 2 into the sockets 29, engaging the aperture 7 of the cloth 1 over sleeve 9, inserting the distal ends 4 of ribs 2 into the pockets 5 of cloth 1, and pivoting outwardly the ribs up to insertion of the reduced diameter portions 38 of the sleeves 37 into the peripheral radial apertures 39 of armature 10 under the bias of springs 40, whereby the sockets 29 are locked in their first position. The cloth 1 is thus spread on armature 10 which can be mounted on the lamphead 17 by insertion of sleeve 9 thereon and engagement of the bayonet slots 15 on nuts 16. Disassembly from the lamphead is obtained by the reverse operation. Disassembly of the reflector simply requires unlocking of the locking assembly 36 by pulling sleeves 37 as described hereinbefore whereby the sockets 29 may be pivoted into their second position, the cloth 1 may be removed from the distal ends 4 of the ribs 2 and from the sleeve 9, and the ribs 2 removed from the socket 29.

Variants are available.

The reflector may be other than quadrangular as shown, for example triangular or octagonal, with the corresponding number of ribs, sockets and locking assemblies.

For reflectors where angular positioning is not required, the armature assembly may avoid the rotary disk 13 and brake assembly 20. Similarly, depending on the fixing envisaged for the armature on the light source, sleeve 9 may not project beyond the armature.

The brake assembly 20 may use a lever operated cam for urging pad 21 to brake disk 13 instead of the bolt 23 and nut 24 as described.

Depending on the flexibility of the ribs, the sockets may be fixed in or on the armature.

The armature may be formed of one single ring with the corresponding slots, apertures and bearings formed therein, and closure parts affixed to said single ring where needed for holding the disk and axis of the pivotal sockets. Similarly, the sockets may be pivoted on the periphery of the armature which would therefore not need the slots for passage of the arms supporting the sockets; in this case, locking of the sockets in the first position could be achieved by spring loaded studs movably mounted on the sockets for insertion in peripheral apertures of the armature.

The distal ends of the ribs may be permanently fixed to the edge portions of the cloth.

The armature may be other than ring shaped. In particular in this case, a single pole affixed to the armature would allow fixing thereof to the bulb side of the lamphead, whereby the cloth would do the same job as that of the so-called umbrella light-shapers, but without the light disturbing articulations of conventional umbrella light shapers.

I claim:

1. A light reflector for use in photography, comprising an armature adapted to be fastened to a light source, a plurality of sockets pivotally mounted to the armature such that each said socket is pivotable between a first position where the socket extends substantially peripherally of the armature and a second position where the socket extends at substantially 90° from the first position, a plurality of radial ribs, each said rib having a proximal end removably engaged in a respective one of said sockets and a distal end spaced from the armature, a metallized cloth supportable on the ribs, the metallized cloth having a substantially central portion which engages said armature and edge portions engaged with the respective distal ends of the ribs.

2. A light reflector according to claim 1, wherein the armature is ring shaped, said first position of the socket being radial to the ring shaped armature and said second position of the socket being substantially parallel to an axis of the ring shaped armature.

3. A light reflector according to claim 2, wherein said ring shaped armature is formed of two rings assembled to one another in facing condition, said facing rings comprising a plurality of radial transverse slots, and each of said sockets being mounted on an arm pivoted between said rings and extending through one of said slots.

4. A light reflector according to claim 3, further comprising a disk mounted between said facing rings, and sleeve means on said disk extending at least partly through said rings for housing said light source.

5. A light reflector according to claim 4, further comprising bayonet slots on said sleeve means for push-and-twist engagement of said light source.

6. A light reflector according to claim 4, wherein said disk is rotatively mounted between said facing rings.

7. A light reflector according to claim 6, further comprising brake means to stop rotation of said disk.

8. A light reflector according to claim 7, wherein said brake means comprise pad means mounted in one of said two rings for reciprocal motion towards and away from said disk, and pusher means on said ring for urging said pad means against said disk.

9. A light reflector according to claim 8, wherein said pusher means comprise bolt means meshing with a nut housed in said ring, said bolt means having one end facing said pad means and another end projecting over said ring.

10. A light reflector according to claim 4, wherein said sleeve means project beyond one of said rings and said central portion of the cloth comprises an aperture engaged on said sleeve means projection.

11. A light reflector according to claim 1, further comprising means for locking the socket in said first position.

12. A light reflector according to claim 11, wherein said means for locking the socket in said first position comprises a sleeve mounted on the socket for reciprocal motion thereon, and a peripheral radial aperture in said ring shaped armature for housing a portion of said sleeve.

13. A light reflector according to claim 12, further comprising spring means between said socket and said sleeve for urging said portion of the sleeve into said radial aperture.

14. A light reflector according to claim 1, wherein the distal end of each of said ribs is removably housed in a pocket formed at said edge portion of the cloth.

* * * * *